(12) United States Patent
Dickinson et al.

(10) Patent No.: US 11,514,455 B2
(45) Date of Patent: Nov. 29, 2022

(54) METHODS FOR PROVIDING AUTOMATED COLLATERAL ELIGIBILITY SERVICES AND DEVICES THEREOF

(71) Applicant: JPMorgan Chase Bank, N.A., New York, NY (US)

(72) Inventors: James Curran Dickinson, Surbiton (GB); Talia Faye Klein, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 218 days.

(21) Appl. No.: 16/230,104

(22) Filed: Dec. 21, 2018

(65) Prior Publication Data

US 2019/0197551 A1 Jun. 27, 2019

Related U.S. Application Data

(60) Provisional application No. 62/609,515, filed on Dec. 22, 2017.

(51) Int. Cl.
*G06Q 20/20* (2012.01)
*G06Q 20/40* (2012.01)
(Continued)

(52) U.S. Cl.
CPC ......... *G06Q 20/4016* (2013.01); *G06F 16/26* (2019.01); *G06F 16/9538* (2019.01)

(58) Field of Classification Search
CPC .............................. G06Q 40/00; G06Q 20/00
See application file for complete search history.

(56) References Cited

U.S. PATENT DOCUMENTS 6,163,771 A * 12/2000 Walker ................... G06Q 20/04
705/18
8,326,759 B2 * 12/2012 Hammad ............ G07F 19/2055
705/44

(Continued)

OTHER PUBLICATIONS

Int'l Search Report (Form PCT/ISA/220 & 210) conducted in Int'l Appln. No. PCT/US18/67173 (dated Apr. 15, 2019).

(Continued)

*Primary Examiner* — Bennett M Sigmond
*Assistant Examiner* — Xavier M. Bennett
(74) *Attorney, Agent, or Firm* — Greenblum & Bernstein, P.L.C.

(57) ABSTRACT

Method, system and non-transitory computer-readable medium configured to store instructions for implementing a method for providing automated collateral eligibility services implemented by one or more collateral management service (CMS) devices between a client and at least one other party. The method includes receiving a collateral eligibility schedule setup request from a client device. The collateral eligibility schedule setup request includes one or more attributes and one or more rules. The method further includes initiating a current collateral eligibility schedule based on the received collateral eligibility schedule setup request; transmitting a notification to the at least one other party to review the current collateral eligibility schedule; receiving approval of the current collateral eligibility schedule from the at least one other party; and activating the approved current collateral eligibility schedule.

15 Claims, 11 Drawing Sheets

(51) Int. Cl.
 *G06F 16/9538* (2019.01)
 *G06F 16/26* (2019.01)

(56) References Cited

U.S. PATENT DOCUMENTS

2007/0244805 A1* 10/2007 Wiryawan .............. G06Q 40/00
 705/38
2010/0228665 A1* 9/2010 Mathieson ............. G06Q 40/00
 705/38

OTHER PUBLICATIONS

Int'l Written Opinion (Form PCT/ISA/237) conducted in Int'l Appln. No. PCT/US18/67173 (dated Apr. 15, 2019).

* cited by examiner

METHODS FOR PROVIDING AUTOMATED COLLATERAL ELIGIBILITY SERVICES AND DEVICES THEREOF

CROSS-REFERENCE TO RELATED APPLICATION

This application claims the benefit under 35 U.S.C. § 119(e) of U.S. Provisional Application No. 62/609,515 filed Dec. 22, 2017, the disclosure of which is expressly incorporated by reference herein in its entirety.

BACKGROUND

Collateral is used across the financial markets in order to manage risk and exposure. A collateral provider and collateral receiver will agree upon the types of eligible collateral for their underlying transaction, which will be memorialized in the eligibility schedule. The rules of the eligibility schedule govern the relationship between the collateral provider and collateral receiver. It is critical that a collateral management service provider (e.g., various financial institutions, banks, etc.) manages and maintains eligibility rules per the client's agreement with their counterparty.

Unfortunately, historic collateral management applications are unintuitive to use, resulting in challenges with respect to a lack of intuitiveness regarding the terms of the eligibility schedule. Furthermore, data is historically fragmented and held in siloes, resulting in limited access by the collateral receiver, collateral provider and collateral management service provider to eligibility schedule data, which is of important in the time of a stressed market event.

SUMMARY

Embodiments are directed to a method and system for generating a collateral schedule and making the completed draft available to the parties of the collateral schedule through a platform that allows for ease of reviewing, amending, accepting and activating the collateral schedule. Further, embodiments are beneficial in that data in schedules can be accessed by the collateral receiver, collateral provider and collateral management service provider to eligibility schedule data.

Embodiments are directed to a method for providing automated collateral eligibility services implemented by one or more collateral management service (CMS) devices between a client and at least one other party. The method includes receiving a collateral eligibility schedule setup request from a client device, wherein the collateral eligibility schedule setup request comprises one or more attributes and one or more rules; initiating a current collateral eligibility schedule based on the received collateral eligibility schedule setup request; transmitting a notification to the at least one other party to review the current collateral eligibility schedule; receiving approval of the current collateral eligibility schedule from the at least one other party; and activating the approved current collateral eligibility schedule.

According to embodiments, the initiating the current collateral eligibility schedule can include manually setting up the schedule through an interface with the one or more CMS devices.

According to other embodiments, the initiating the current collateral eligibility schedule can include transforming a previously stored collateral eligibility schedule to populate an interface with the one or more CMS devices.

In embodiments, before transmitting a notification to the at least one other party, the method can further include storing the current collateral eligibility schedule.

In further embodiments, the method may include storing a plurality of line of business profiles accessible by the interface with the one or more CMS devices; and associating one of the plurality of line of business profiles with the client. The line of business profiles may include workflow requirements and eligibility criteria. Further, based upon the one line of business profile associated with the client, the method may further include one of: dynamically creating current collateral eligibility schedule in an interface with the one or more CMS devices; or transforming a previously stored collateral eligibility schedule to populate an interface with the one or more CMS devices.

In accordance with other embodiments, prior to receiving approval of the current collateral eligibility schedule, the method can further include at least one of: the client modifying the current collateral eligibility schedule via an interface of one or more CMS devices; and the at least one other party modifying the current collateral eligibility schedule via an one or more CMS devices.

According to still other embodiments, prior to transmitting the notification, the method can further include storing the current collateral eligibility schedule in at least one database accessible by the one or more CMS devices. The method may also include receiving a request from an application to identify stored collateral eligibility schedules associated with at least one position and at least one agreement data. The method can also include searching the at least one database accessible by the one or more CMS devices for stored collateral eligibility schedules associated with the at least one position and the at least one agreement data; and presenting search results listing the stored collateral eligibility schedules associated with the at least one position and the at least one agreement data. In further embodiments, the method can also include identifying eligibility and concentration limit constraints in the stored collateral eligibility schedules associated with the at least one position and the at least one agreement data listed in the search results.

In accordance with embodiments, the method can also include selecting one of the stored collateral eligibility schedules associated with the at least one position and the at least one agreement data listed in the search results; and transmitting the selected one of the stored collateral eligibility schedules associated with the at least one position and the at least one agreement data to the requesting application.

In other embodiments, the method may also include selecting one of the stored collateral eligibility schedules associated with the at least one position and the at least one agreement data listed in the search results; modifying the selected one of the stored collateral eligibility schedules associated with the at least one position and the at least one agreement data; and transmitting the modified selected one of the stored collateral eligibility schedules associated with the at least one position and the at least one agreement data to the requesting application.

According to still other embodiments, only one of the client or the at least one other party can access the stored current collateral eligibility schedule in at least one database accessible by the one or more CMS devices at a time.

Embodiments are directed to a system for providing automated collateral eligibility services via one or more collateral management service (CMS) devices. The system includes a processor; and a memory including instructions that, when executed by the processor, cause the processor to perform operations including: receiving a collateral eligibility schedule setup request from a client device, wherein the collateral eligibility schedule setup request comprises one or more attributes and one or more rules; initiating a current collateral eligibility schedule based on the received collateral eligibility schedule setup request; transmitting a notification to the at least one other party to review the current collateral eligibility schedule; receiving approval of the current collateral eligibility schedule from the at least one other party; and activating the approved current collateral eligibility schedule.

According to embodiments, the initiating the current collateral eligibility schedule can include one of: manually setting up the schedule through an interface with the one or more CMS devices; or transforming a previously stored collateral eligibility schedule to populate an interface with the one or more CMS devices.

Embodiments are directed to a non-transitory computer-readable medium configured to store instructions for implementing a method for providing automated collateral eligibility services via one or more collateral management service (CMS) devices. When executed, the instructions cause a computer to: receive a collateral eligibility schedule setup request from a client device, wherein the collateral eligibility schedule setup request comprises one or more attributes and one or more rules; initiate a current collateral eligibility schedule based on the received collateral eligibility schedule setup request; transmit a notification to the at least one other party to review the current collateral eligibility schedule; receive approval of the current collateral eligibility schedule from the at least one other party; and activate the approved current collateral eligibility schedule.

In accordance with still yet other embodiments, to initiate the current collateral eligibility schedule, the instructions cause the computer to one of: manually set up the schedule through an interface with the one or more CMS devices; or transform a previously stored collateral eligibility schedule to populate an interface with the one or more CMS devices.

BRIEF DESCRIPTION OF THE DRAWINGS

FIGS. 5A and 5B illustrate exemplary interfaces for reviewing the schedule level rules applied to the approved eligibility schedule;

FIGS. 6A and 6B illustrate exemplary interfaces for reviewing the instrument level rules applied to the approved eligibility schedule;

DETAILED DESCRIPTION

Through one or more of its various aspects, embodiments and/or specific features or sub-components of the present disclosure, are intended to bring out one or more of the advantages as specifically described above and noted below.

Figure 1:
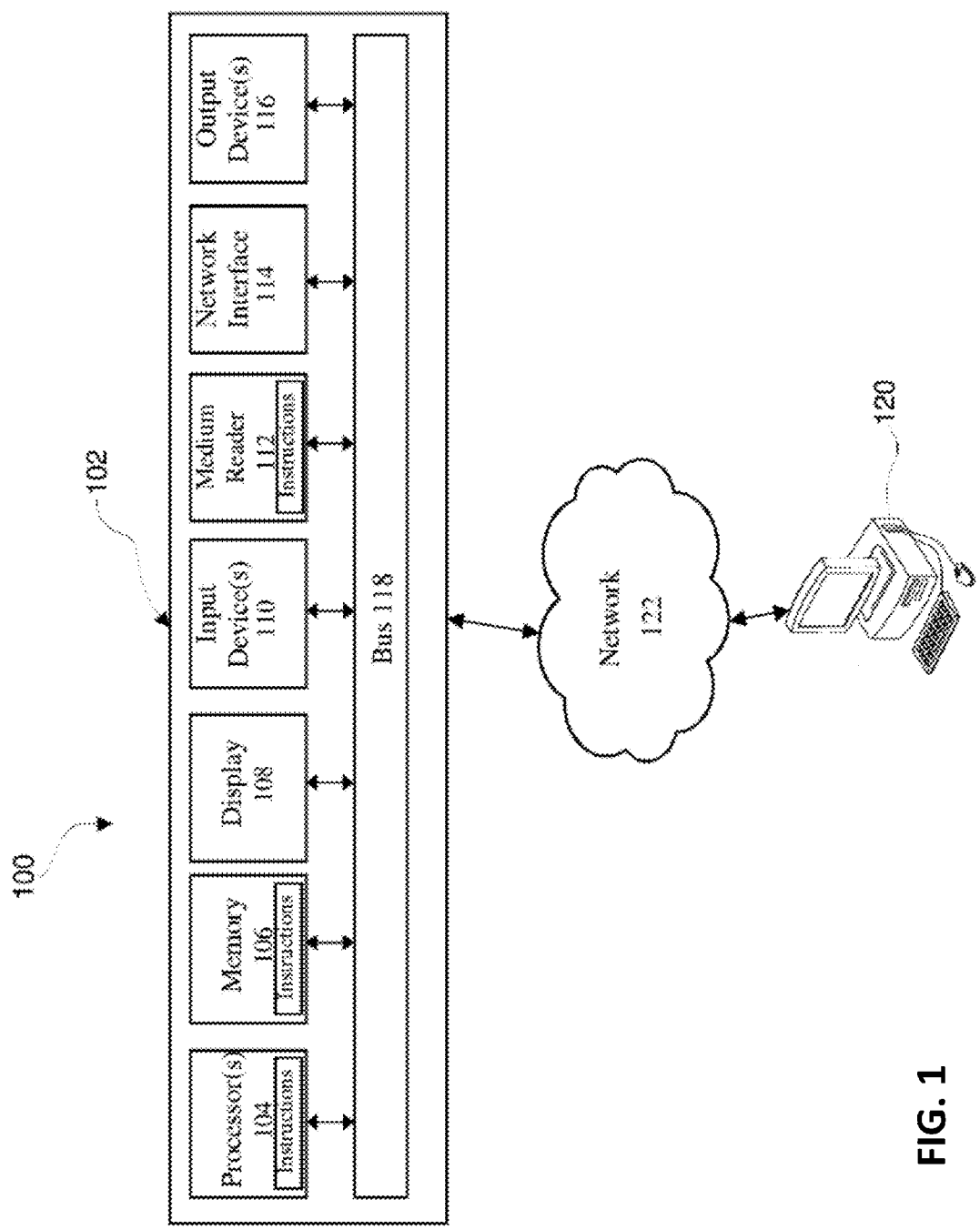
FIG. 1 illustrates an exemplary system for performing collateral management services.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT). a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read anyone or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, ZigBee, infrared, near field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
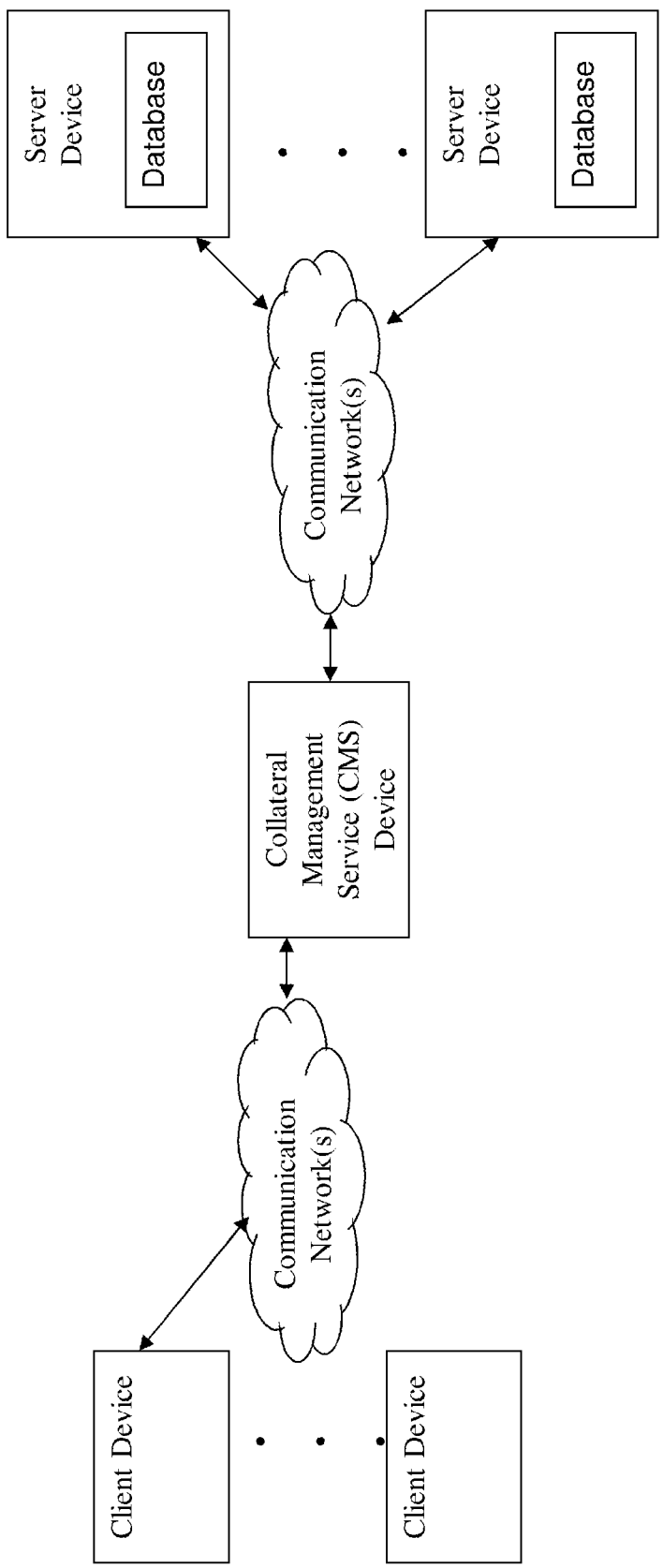
FIG. 2 illustrates a collateral management service in accordance with embodiments.

Referring to FIG. 2, an exemplary network environment with an exemplary collateral management service (CMS) device is illustrated. The CMS device in this example is coupled to a plurality of server devices hosting databases and a plurality of client devices via communication network(s), although the CMS device, server devices, and/or client devices, may be coupled together via other topologies. Additionally, the network environment may include other network devices such as one or more routers and/or switches, for example, which are well known in the art and thus will not be described herein. This technology provides a number of advantages including methods, non-transitory computer readable media, and CMS devices that efficiently process collateral eligibility schedule setup requests that include specific workflow requirement to automatically facilitate generation of eligibility schedules based on associated rules.

Figure 3:
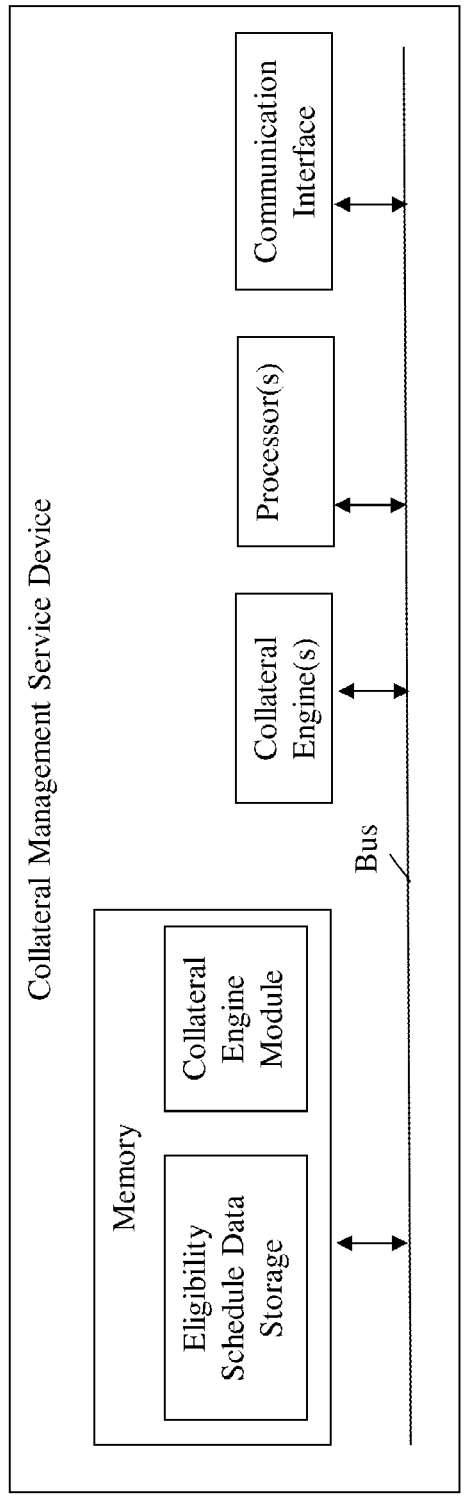
FIG. 3 illustrates an exemplary embodiment of a collateral management system device.

As shown in FIG. 3, the CMS device in this example includes one or more processors, a memory, a collateral engine, and/or a communication interface, which are coupled together by a bus or other communication link, although the CMS device can include other types and/or numbers of elements in other configurations. Both the processor(s) and the collateral engines of the CMS device may execute programmed instructions stored in the memory for the any number of the functions described and illustrated herein, and many include one or more CPUs or general purpose processors with one or more processing cores, for example, although other types of processor(s) can also be used. The collateral engine(s) of the CMS device may execute programmed instructions stored in the memory for the any number of the functions described and illustrated herein. The collateral engine(s) of the CMS device may include one or more CPUs or general purpose processors with one or more processing cores; for example, although other types of processor(s) can also be used.

The memory of the CMS device stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Accordingly, the memory of the CMS device can store one or more applications that can include executable instructions that, when executed by the CMS device, causes the CMS device to perform actions, such as to transmit, receive, or otherwise process rules, for example, and to perform other actions described and illustrated below with reference to FIGS. 4-9. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the CMS device itself, may be located in virtual server(s) running in a cloud-based computing environment rather than being tied to one or more specific physical network computing devices. Also, the application(s) may be running in one or more virtual machines (VMs) executing on the CMS device. Additionally, in one or more embodiments of this technology, virtual machine(s) running on the CMS device may be managed or supervised by a hypervisor.

The memory of the CMS device can include the eligibility schedule data store and the line of business profile. Moreover, the memory can include other rules, policies, modules, databases, or applications, for example. The line of business profile is configurable to allow each distinct group of users to store available criteria independently from other users e.g., which types of various eligibility/haircut/concentration limit rule types can be utilized, which reference data attributes are available for use when defining the rules, what translations rules can be used to convert a schedule represented in using one set of attributes into another set, and workflow requirements e.g., based on the type of change made to the schedule and the financial impact to the parties involved what types of approval are required before the schedule can be activated associated with a specific business, e.g., Collateral Management Service providers, trading desks, clearing houses utilizing the CMS device. Individual businesses may define one or more attributes, e.g., asset classification, instrument ratings, country codes, currency codes, depositories, average daily trading volume, workflow definitions, e.g., draft, pending approval, pending execution, active, superseded, schedule sources, e.g., bilaterally agreed, triparty agent, clearing houses and/or translation rules e.g., 'Asset Class=Bonds and Rating>AAA' translated to 'Model Class='Debt' and Lowest (Moodys Issuer Rating, S&P Issuer Rating)>'AAA/Aaa' which are stored in a line of business profile, although any other type of rules associated with the individual business e.g., requirement amount, margin call amount, instrument underlying/overlying attributes, associated party attributes, index membership, may be included. Further, the line of business profile database is a flexible storage model database, which provides the advantage of accepting various types of attributes and rules from distinct individual businesses offering similar goods, services, etc. By accepting and storing the line business profile from various distinct businesses, the businesses are provided the ease of extending their offered services over cross-platform data integration without requiring any additional underlying technical code changes for conversion. The rules stored in the line of business profile are utilized for generating and updating the eligibility schedules in the eligibility schedule data store.

The collateral schedules received from the end users utilizing the available attributes and rules in the line of business profile are stored in the eligibility schedule data store within the memory of the CMS device. The eligibility schedule data store may also store status information associated with eligibility schedules which may include, by way of example, active status, draft status, pending approval status, pending activation status. Further, the eligibility schedule data store may also store various rules associated with eligibility schedules which may include, by way of example, schedule level rules and instrument level rules. Further the eligibility schedule data store may also store associated agreement information which may include, by way of example, account information associated with collateral receivers, account information associated with collateral service providers and other agreement information associated with the collateral eligibility schedule, although other types of rules can also be stored.

The communication interface of the CMS device operatively couples and communicates between the CMS device, the server devices, and/or the client devices, which are all coupled together by the communication network(s), although other types and/or numbers of communication networks or systems with other types and/or numbers of connections and/or configurations to other devices and/or elements can also be used.

By way of example only, the communication network(s) can include local area network(s) (LAN(s)) or wide area network(s) (WAN(s)), and can use TCP/IP over Ethernet and industry-standard protocols, although other types and/or numbers of protocols and/or communication networks can be used. The communication network(s) in this example can employ any suitable interface mechanisms and network communication technologies including, for example, tele traffic in any suitable form (e.g., voice, modem, and the like), Public Switched Telephone Network (PSTNs), Ethernet-based Packet Data Networks (PDNs), combinations thereof, and the like.

The CMS device can be a standalone device or integrated with one or more other devices or apparatuses, such as one or more of the server devices, for example. In one particular example, the CMS device can include or be hosted by one of the server devices, and other arrangements are also possible. Moreover, one or more of the devices of the CMS device can be in a same or a different communication network including one or more public, private, or cloud networks, for example.

Each of the server devices in this example includes one or more processors, a memory, and a communication interface, which are coupled together by a bus or other communication link, although other numbers and/or types of network devices could be used. The server devices in this example process requests received from the CMS device via the communication network(s) according to the HTTP-based and/or JavaScript Object Notation (JSON) protocol, for example, although other protocols can also be used.

The server devices may be hardware or software or may represent a system with multiple servers in a pool, which may include internal or external networks. The server devices may host databases that are configured to store information associated with the collateral eligibility schedules.

Although the server devices are illustrated as single devices, one or more actions of each of the server devices may be distributed across one or more distinct network computing devices that together comprise one or more of the server devices. Moreover, the server devices are not limited to a particular configuration. Thus, the server devices may contain a plurality of network computing devices that operate using a master/slave approach, whereby one of the network computing devices of the server devices operate to manage and/or otherwise coordinate operations of the other network computing devices.

The server devices may operate as a plurality of network computing devices within a cluster architecture, a peer-to peer architecture, virtual machines (including, for example, cloud-based computers), or within a cloud architecture, for example. Thus, the technology disclosed herein is not to be construed as being limited to a single environment and other configurations and architectures are also envisaged.

The client devices in this example include any type of computing device that can facilitate the generation of price quote requests, such as in response to user interaction with graphical user interfaces for example. Accordingly, the client devices can be mobile computing devices, desktop computing devices, laptop computing devices, tablet computing devices, virtual machines (including, for example, cloud-based computers), or the like, that host chat, e-mail, or voice-to-text applications, for example. Each of the client devices in this example includes a processor, a memory, and a communication interface, which are coupled together by a bus or other communication link, although other numbers and/or types of network devices could be used. The client devices may be accessed by clients who may include, by way of example, collateral receivers and collateral providers. Further the collateral receivers and the collateral providers may use the client devices to communicate with the CMS device or server devices directly or via the communication network.

The client devices may run interface applications, such as standard web browsers or standalone client applications, which may provide an interface to communicate with the CMS device via the communication network(s) in order to communicate user requests. The client devices may further include a display device, such as a display screen or touchscreen, and/or an input device, such as a keyboard, for example.

Although the exemplary network environment with the CMS device, server devices, client devices, and communication network(s) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as the CMS device, client devices, or server devices, for example, may be configured to operate as virtual instances on the same physical machine. In other words, one or more of the CMS device, client devices, or server devices may operate on the same physical device rather than as separate devices communicating through communication network(s). Additionally, there may be more or fewer CMS devices, client devices, or pricing server devices than illustrated in FIG. 2.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples above may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

In embodiments, the automated collateral eligibility services can act as a centralized hub for internal and external users to manage and monitor collateral eligibility. For example, in embodiments, the automated collateral eligibility services can allow clients to view eligibility schedules on a single screen and utilize exports and management information system reports to meet risk and optimization requirements. In embodiments, the automated collateral eligibility service can allow users to search and answer their own queries of eligibility rules based on a variety of data points (e.g., what accounts have the potential to be exposed to S&P 500 stocks). The end state aims to integrate the eligibility search with positions and asset search (e.g., to which counterparties am I currently exposed to Japanese bonds?). In further embodiments, a simple more efficient eligibility input process can be provided. Strategically, the workflow and user interface should be intuitive and streamlined enough for clients to self-instruct their eligibility schedules using digital signature technology. However, based on the complexity of the migration to a new application, initially the input screens should be used for internal operations to input schedules to CMS based on the client's instructions.

Embodiments of the automated collateral eligibility service improve transparency and accuracy of eligibility rule setup by eliminating intermediate translation tasks. Further, the time to market for implementation of new eligibility schedule can be decreased, while the STP rate is increased.

An exemplary method of providing automated collateral eligibility services will now be described with reference to an exemplary flow diagram in FIG. 4. In the exemplary flow, in 400, the CMS device receives, from a user, a collateral eligibility schedule setup request, which includes one or more rules, e.g., schedule rules, instrument rules, and any other type of rules associated with the schedule, that are stored in the eligibility schedule data store. Moreover, the collateral eligibility schedule setup request includes the available rules and attributes stored in the line of business profile selected by the user.

The collateral eligibility schedule setup request can be submitted to CMS as new schedules or amendments to existing schedules. By way of example, the following scenarios can be related to client schedule eligibility requests:
1. Request to setup a new schedule associated to new account(s) for a new Collateral Provider and/or Collateral Receiver relationship.
2. Request to setup a new schedule associated to new account(s) for an existing Collateral Provider and/or Collateral Receiver relationship.
3. Addition of account(s) associated with an existing schedule
4. Amendment to an existing schedule with no change to the account(s)
5. Addition of account(s) together with an amendment to the associated existing schedule
6. Deletion of account(s) associated with an existing schedule The collateral eligibility schedule setup request may include, by way of example, a request to initiate or create a new eligibility schedule or a request to update a previously stored eligibility schedule. Of course, it is understood that various other types of eligibility schedule setup requests, which have been set forth above, may also be included without departing from the spirit and scope of the disclosed embodiments. In this example, when the request received from the user/individual business is to set up a new eligibility schedule, it may further be associated with setting up a new agreement and/or establishing the new collateral receiver/collateral provider relationship. The eligibility schedule setup request defined by the collateral receiver and/or collateral provider may include workflow requirements and eligibility rules.

In 402, the new collateral eligibility schedule is initiated, which is based on the terms of the parties' agreement and on the one or more rules and attributes received in the collateral eligibility schedule request. After the schedule is initiated, a determination is made whether the schedule is to be set up manually at 403.

When the schedule is to be set up manually, the process moves to 404, where the CMS device provides a user interface for a user (or a system administrator) to manually set up the new schedule directly in the CMS. The user may make changes and updates based on the user requirement to set up the schedule manually. Once the user has made the manual changes the method proceeds to 408.

Alternatively, when the schedule is not to be set up manually, the process moves to 406, where the CMS device transforms eligibility schedules stored in the CMS database complying with the client's request. CMS supports storage & use of schedules sourced from multiple other systems and formats, for example the legally binding version of a schedule me be mastered at a $3^{rd}$ party financial institution. CMS can consume, convert and store a copy which may originally be in e.g., XML, Excel, JSON in its memory which can then be used alongside other schedules. In this way, the CMS device can systemically transform to a generic flexible canonical data model the eligibility schedules stored digitally in a third party application based on one or more rules as defined by the individual businesses in the line of business profile. Once the completed schedule has been either manually entered or automatically transformed the method proceeds to 408.

In 408, the CMS device associates the setup eligibility schedule, e.g., as setup in 404 or 406, with one or more business entities, e.g., trading parties, escrow accounts, financial institutions. Once the schedule is associated with the one or more business entities, the method proceeds to 409, where a notification may be transmitted, e.g., via email, SMS text, etc., to the parties/approval sources to review the collateral eligibility schedule and to transmit their approval, e.g., after logging into the CMS and reviewing the schedule. Alternatively or additionally, the notification can additionally forward a link or shortcut to the relevant schedule for ease of review by the notified party.

Moreover, through this notification, users can be notified when there is an eligibility change affecting their account(s). It is preferable that users are made aware of when there will be a change made to their account regarding eligibility. This can be particularly advantageous for Collateral Providers when schedule changes do not require dual execution (i.e., both parties approving the schedule before submission). Further, users can also be notified, e.g., when they are needed to perform an action. Because users can be are sensitive to the amount of time it takes to amend a schedule or set up new schedule, this digitized process allows users to receive notifications via email and on the CMS user interface that an outstanding action has been assigned to them (e.g., to approve a schedule amendment) and how long the action has been outstanding. Still further, when a user submits a schedule amendment, these changes can be shown on screen and the user can be notified via email with a summary of the changes in order to increase transparency.

An individual schedule can be associated with one or more Collateral Receivers and Collateral Providers. This is because the Collateral Receiver is the client stipulating the terms of the schedule (even though in some cases it may need to be approved by both parties).

In 410, the CMS device makes a determination whether all of the required approvals have been received prior to activating the schedule. If the CMS device determines that the approvals from the one or more approval sources, which in this example the approval sources include the collateral provider, the collateral receiver and the collateral management provider, have not been received then the No branch is taken and loops back to 410 until all approvals are received. Thus, the CMS device waits, as the method loops until all of the approvals from the necessary approval sources are received. In another example, a user or a system administrator may reject/amend the schedule manually using a user interface upon determining that the schedule has errors that need to be corrected.

If the CMS device at 410 determines all of the necessary approvals from the three approval sources, including the collateral provider, the collateral receiver and the collateral management provider, have been received, then the Yes branch is taken. At 412, the now approved eligibility schedule is stored. In the regard, the CMS device can store the approved schedule in one or more databases associated with a server device.

At 414, the CMS device may activate the approved schedule when the activation date transpires. The activated schedule may now be actively used by the collateral engine to meet collateral requirements.

Thus, embodiments provide a method and system for generating a collateral schedule and making the completed draft available to the parties of the collateral schedule through a platform that allows for ease of reviewing, amending, accepting and activating the collateral schedule. Further, embodiments are beneficial in that data in schedules can be accessed by the collateral receiver, collateral provider and collateral management service provider to eligibility schedule data.

At 416, the CMS device receives a request from an upstream application, e.g., an application that is responsible for moving assets to ensure a parties collateral obligations are met, an application that is responsible for optimizing assets currently used as collateral, that requires eligibility information for one or more positions and one or more business entities. The CMS device includes multiple interfaces that support these requests and the method proceeds to step 418.

At 418, the CMS device identifies one or more schedules associated with the received one or more positions and one or more business entities. The one or more business entities may include account details, account types, party details, requirement types, simulation data, etc. However, it is to be understood that any other type of data may also be included in the agreement data without departing from the spirit and scope of the claimed embodiments. Upon determining the one or more schedules associated with the received one or more positions and one or more business entities the method proceeds to 420.

Figure 5A:
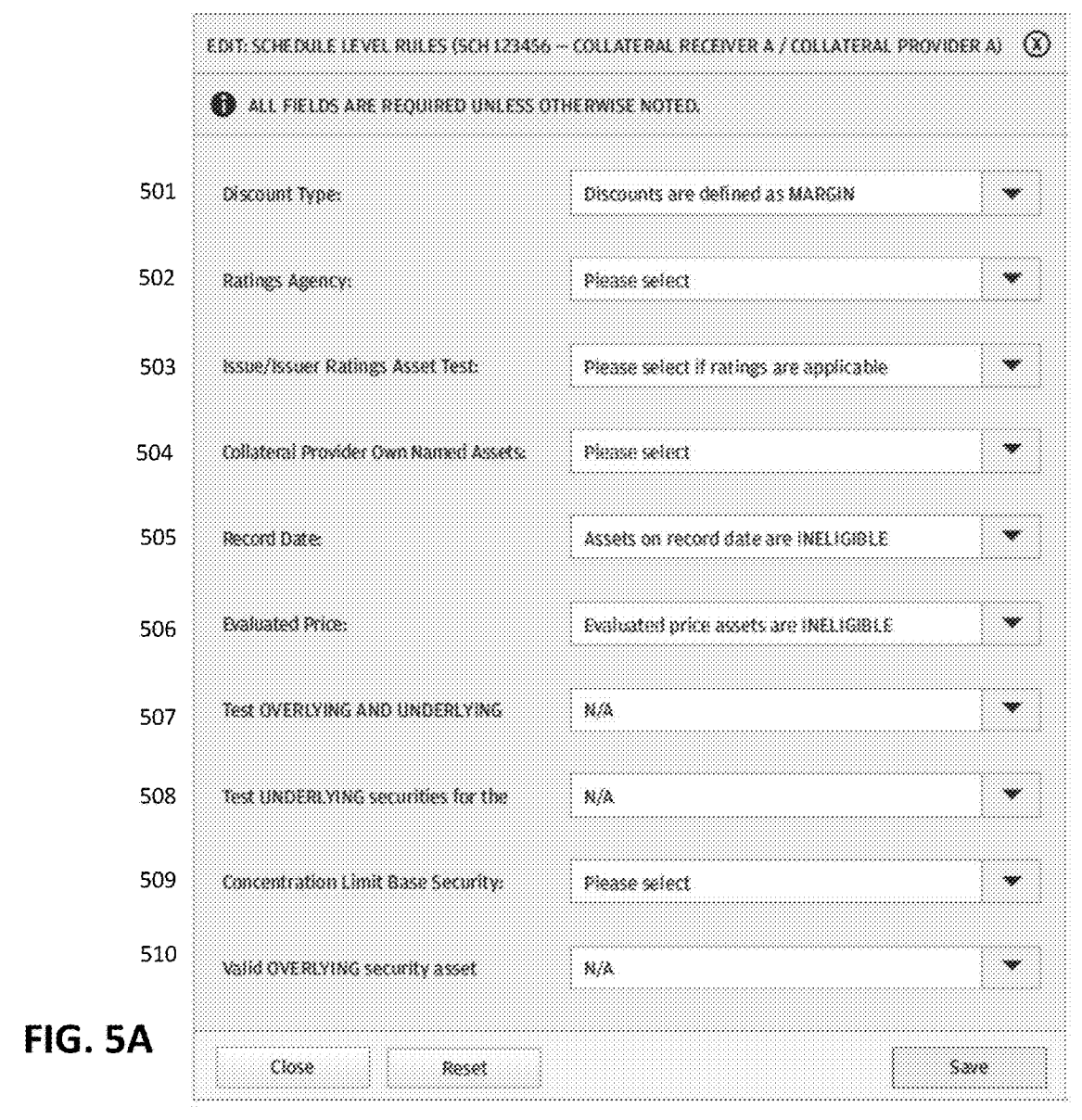
Figure 5B:
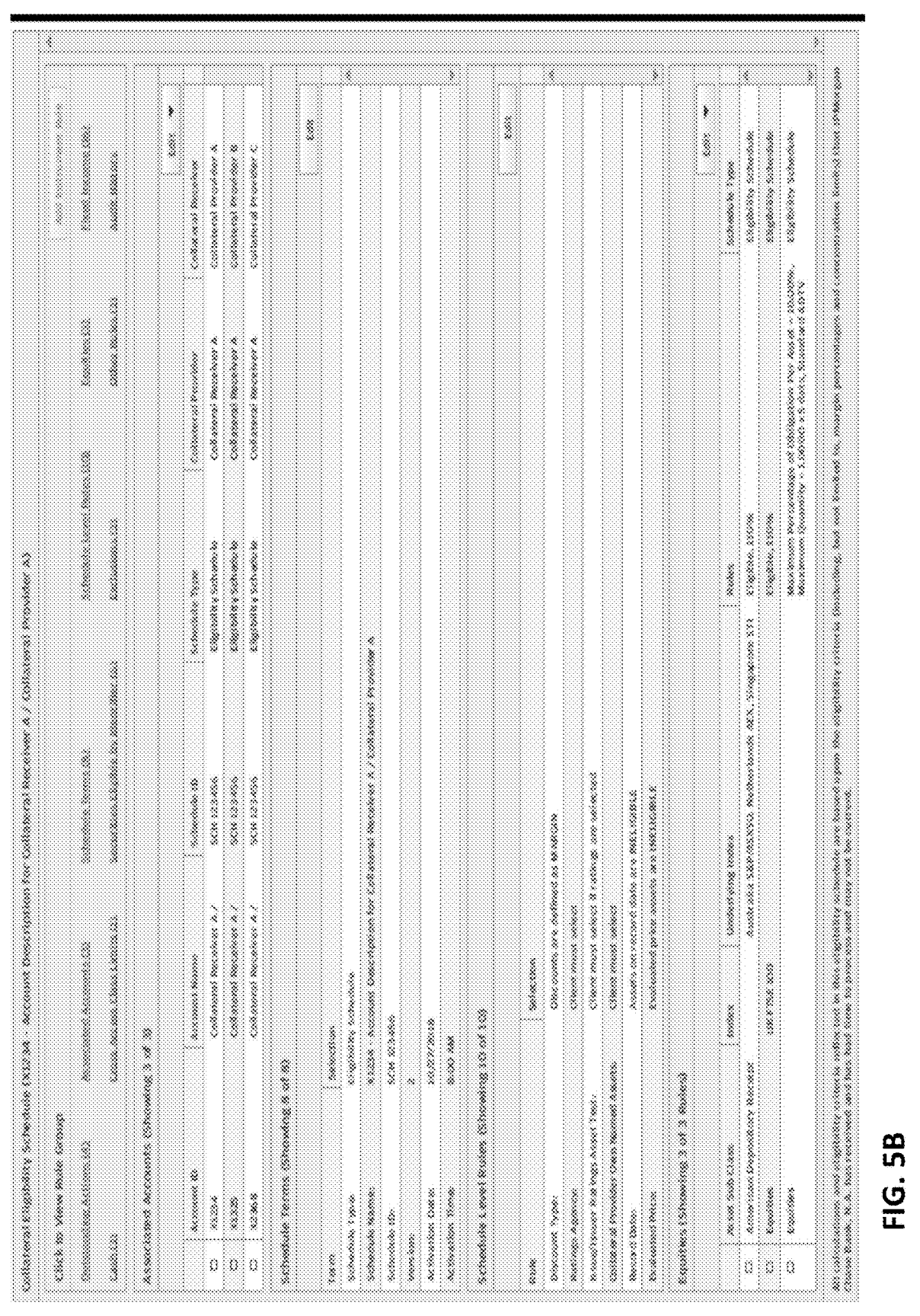

At 420, the CMS device identifies eligibility, discount and concentration limit constraints based on the one or more schedule rules and one or more instrument rules associated with the identified/determined one or more schedules. Eligibility terms define what assets can be used as collateral. Discount (also known as haircuts or margins) defines the discount that is applied to the market value of an asset if it is used as collateral. Concentration limits define how much of an asset is allowed to be used and can be based on various attributes, e.g., average daily trading volume, % of the requirement, % of a specific issuer, % of a financial sector. As discussed above, various rules may be stored in the eligibility schedule data store, for example, schedule level rules and instrument level rules, although any other types of rules may also be stored. In this example, the CMS device may identify the schedule level rules with the approved eligibility schedule. Exemplary interfaces for reviewing the schedule level rules applied to the approved eligibility schedule are illustrated in FIGS. 5A and 5B. While any number and types of rules can be applied, the schedule level rules in the exemplary embodiments may include, by way of example, a discount type 501; in this example discounts are defined as margins or haircuts. Further, a rating agency 502 from which ratings are tested, which in this example, defines ratings tested from Moody's and S&P but other agencies are supported, e.g. Fitch. An issue/issuer asset test 503 can be identified, e.g., if ratings are applicable, to test the asset rating. Information as to whether the Collateral Provider Owns the named asset 504 can also be inserted. Further, the schedule may test the eligibility of assets 505 on record date, which in this example defines whether the assets on the record date are eligible or ineligible. Evaluated price 506 can also be inserted. Further, the CMS can be instructed to Test Overlying and Underlying . . . 507 and to Test Underlying Securities for the . . . 508. Concentration Limit Base Security 509 can be selected from a pull-down menu, and whether a Valid Overlying Security Asset 510 has been provided can also be identified.

Figure 6A:
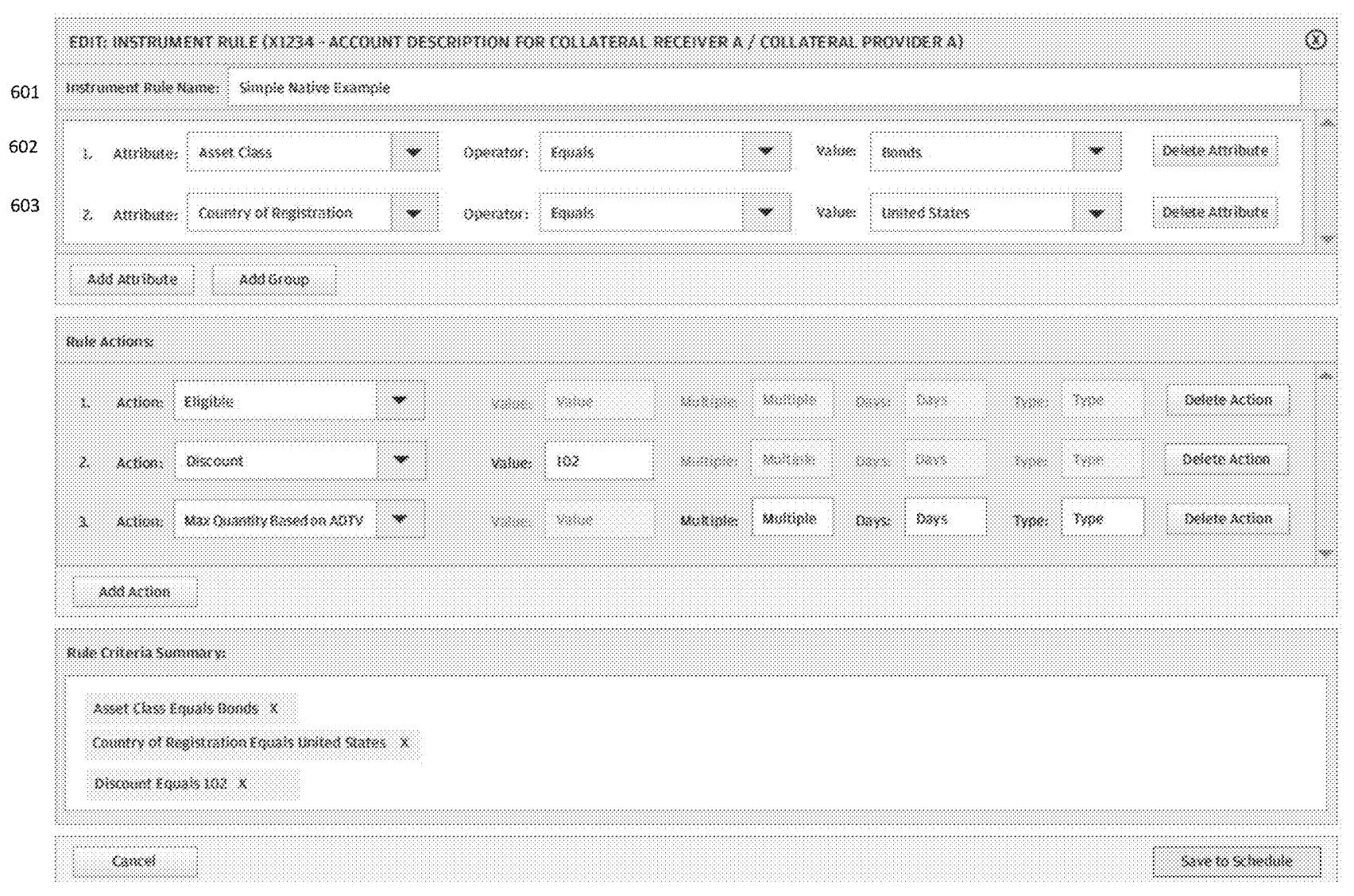
Figure 6B:
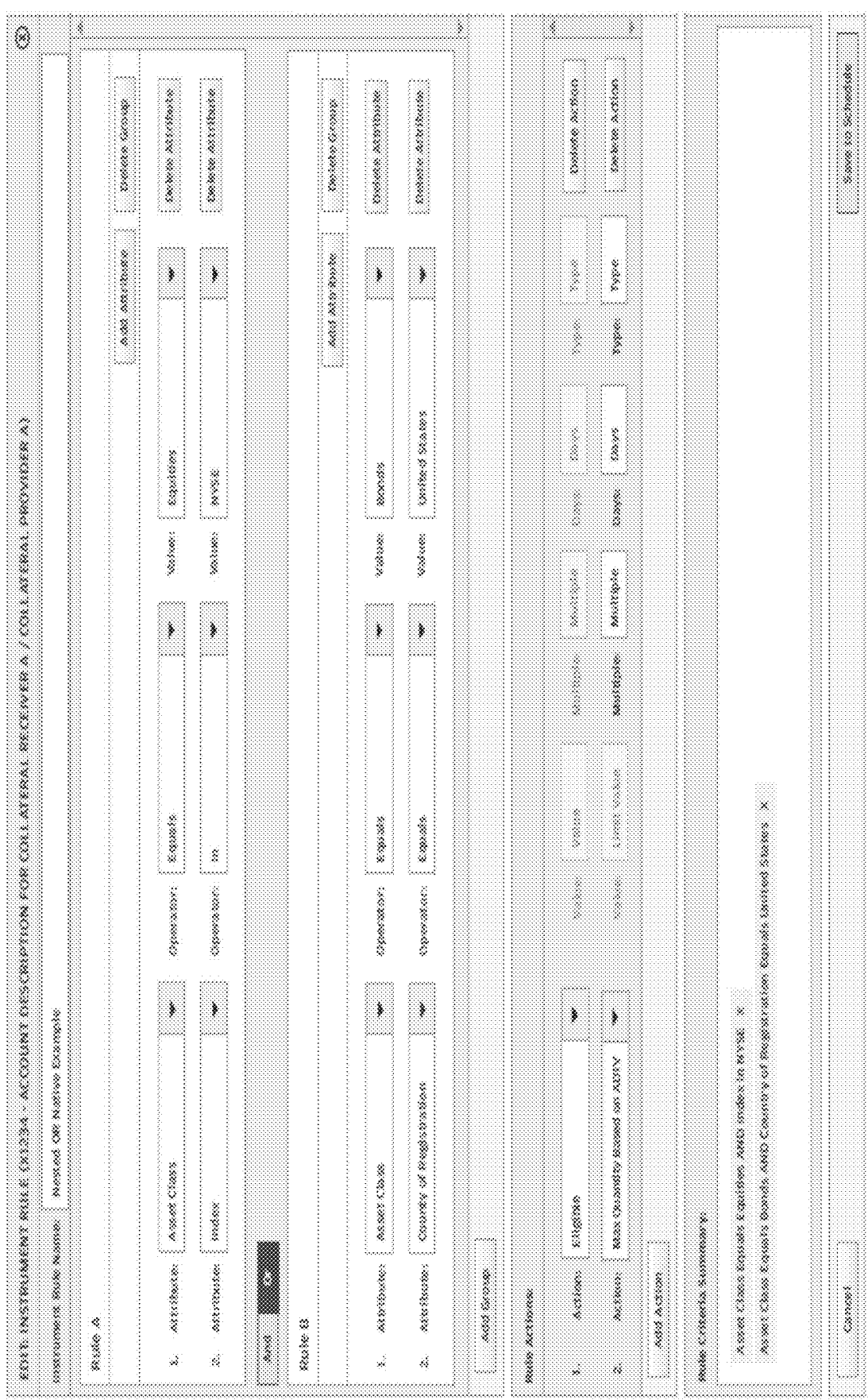

Further, the CMS device may associate the instrument level rules with the approved eligibility schedule, and the instrument level rules applied to the approved eligibility schedule can be explained with reference to exemplary interfaces depicted in FIGS. 6A and 6B to edit instrument level rules. FIG. 6A illustrates a simple rule stating whether 'Bonds' in 'United States' are eligible and if so what discount and concentration limit apply. While any number and types of rules can be applied, the instrument level rule in the exemplary embodiment is directed to Instrument Rule Name 601, which can be Simple Native Example. Of course, other instrument rule names can be utilized and edited, e.g., US Equities, G7 Countries, without departing from the spirit and scope of the disclosed embodiments. In the exemplary embodiment, attributes 602, 603 can be identified to define that an asset class equals bonds and that the country of registration is the United States. Of course, these attributes are merely identified for the ease of description and are not intended to be limiting of the available attributes. In this embodiment, a maximum percentage of obligation per asset and maximum quantity may be identified. FIG. 6B illustrates a complex rule using multiple conditions 'Equities' on 'NYSE' or 'Bonds' in 'United States'. The CMS system supports any combination of criteria defined using various conditions and operators, e.g., and, or, not, equals, not equals, greater than, less than, in, not in. The client may access the approved eligibility schedule via the user interface and make further changes to the rules.

At 422, the CMS device generates a response for the upstream application based on the eligibility and concentration limit constraints identified at 420. The response is with eligible positions, and may include discount and concentration limit constraints. The responses provide all the information the upstream application needs to calculate collateral value of the positions and identify the optimal assets to use to meet their collateral obligations without requiring knowledge or interpreting the rules held in CMS.

At 424, the CMS device transmits the response generated at 422 to the upstream application.

Figure 4:
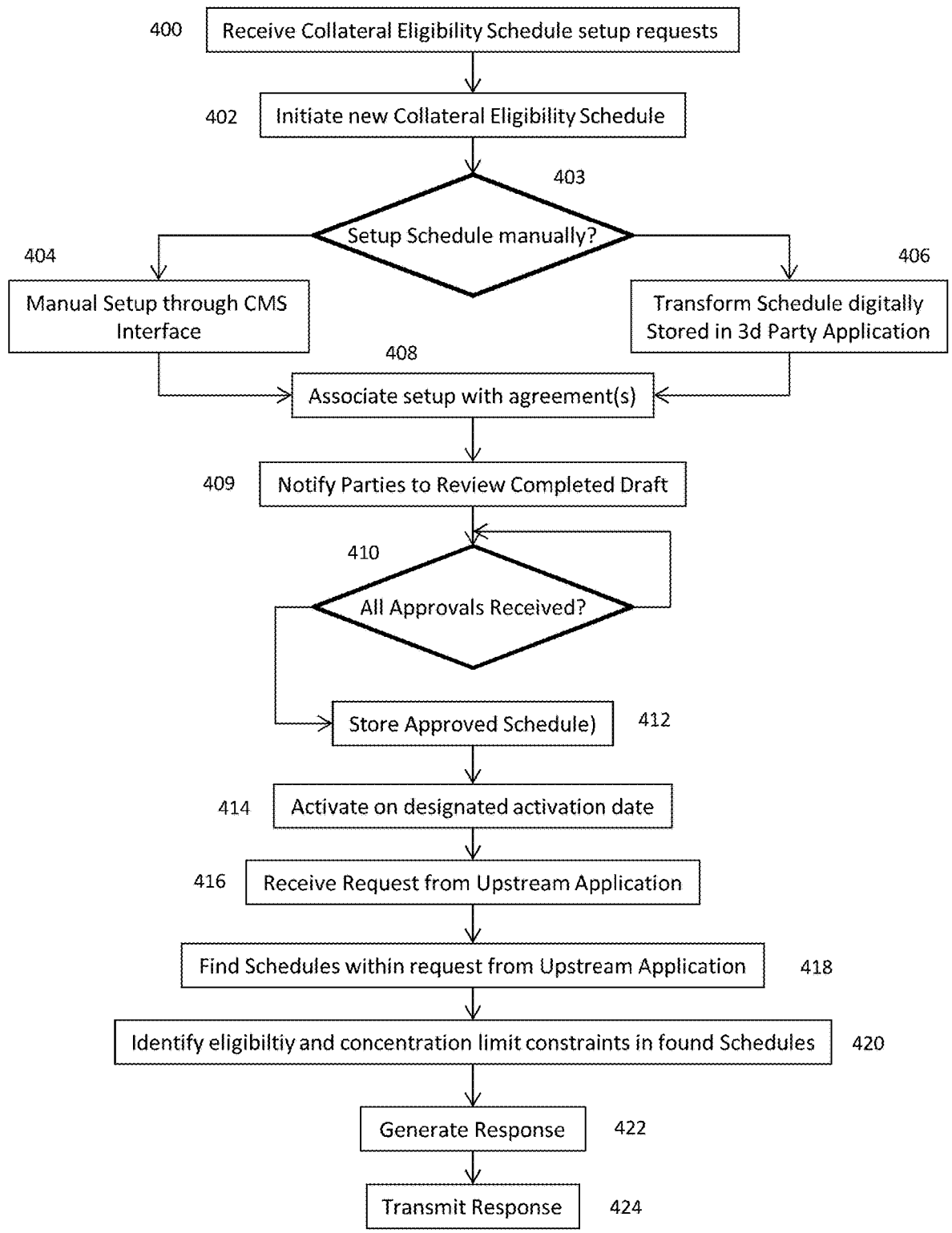
FIG. 4 illustrates a flow diagram of an exemplary process for performing collateral management services.

In another example, the collateral eligibility schedule may further include status indicators that may be displayed on the user interface with the new eligibility schedule at 410 in FIG. 4. The status indictors, may include, by way of example, active, draft, pending approval, pending execution, pending activation and inactive, although any other different type and number of status indicator may be used. Accordingly, this technology provides a centralized hub for internal and external users to manage and monitor the collateral eligibility schedule and thus providing end users a more streamlined approach for managing and optimizing their collateral.

Figure 7:
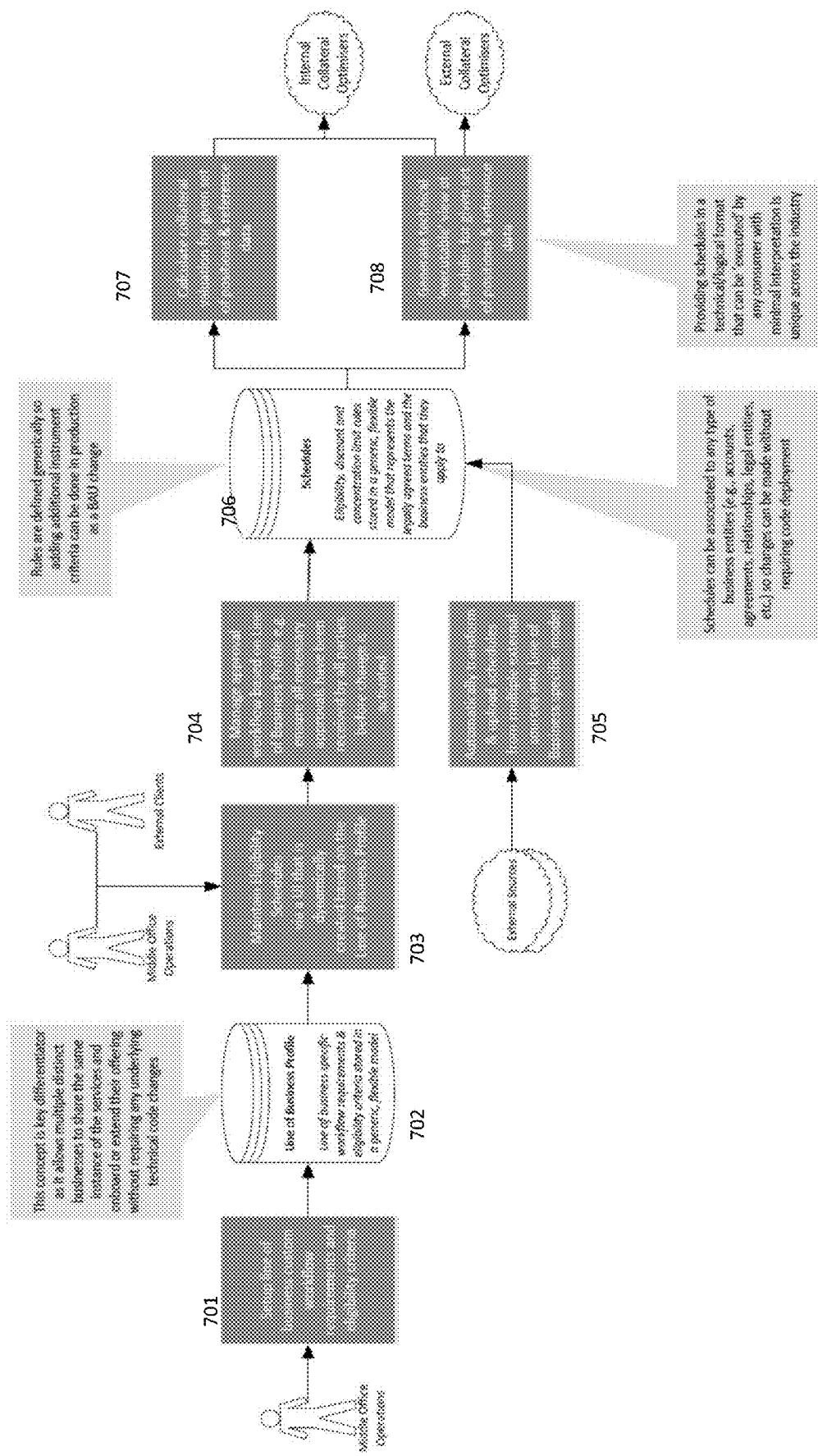
FIG. 7 illustrates a further embodiment of the process for performing collateral management services.

FIG. 7 illustrates another exemplary diagram for operating the CMS. In particular, a user of the CMS can initiate a procedure at 701 to setup custom workflow requirements and eligibility criteria specific to the user's line of business. These workflow requirements and eligibility criteria can be stored in a generic, flexible model in at least one database associated with the CMS as a line of business profile at 702. This line of business profile allows multiple distinct businesses offering similar goods, services, etc. to share certain data without requiring separate infrastructure or additional investment to utilize additional features and attributes available in the CMS system. CMS users or external clients can access eligibility schedules through a dynamically created user interface that is based upon the line of business profile so as to maintain these schedules at 703. At 704, CMS can manage approval workflow based on line of business profiles. In this way, it can be ensured that all necessary approvals from the approval sources are received prior to a schedule being activated or amended. Additionally or alternatively, at 705, schedules from multiple external sources can be automatically transformed and uploaded into the CMS as specific line of business models. At 706, the eligibility, discount and concentration limit rules for the stored schedules in 704 and/or for the transformed and uploaded schedules in 705 can be stored in the generic, flexible model that identifies the legally agreed to terms and the business entities to which they apply. These schedules can be associated to any type of business entities, such as accounts, agreements, relationships, legal entities, etc., to changes can be made without requiring code deployment. Collateral valuation for given sets of positions and reference data can be calculated at 707, and a technical executable view of schedules for given sets of positions and reference data can be generated at 708. The calculated collateral valuation at 707 and the generated executable view of the schedule can be reviewed by internal collateral optimizers, while the generated executable view of the schedule can be reviewed by external collateral optimizers. This providing of schedules in a technical logical format that can be executed by any consumer with minimal interpretation is unique in the industry.

Figure 8:
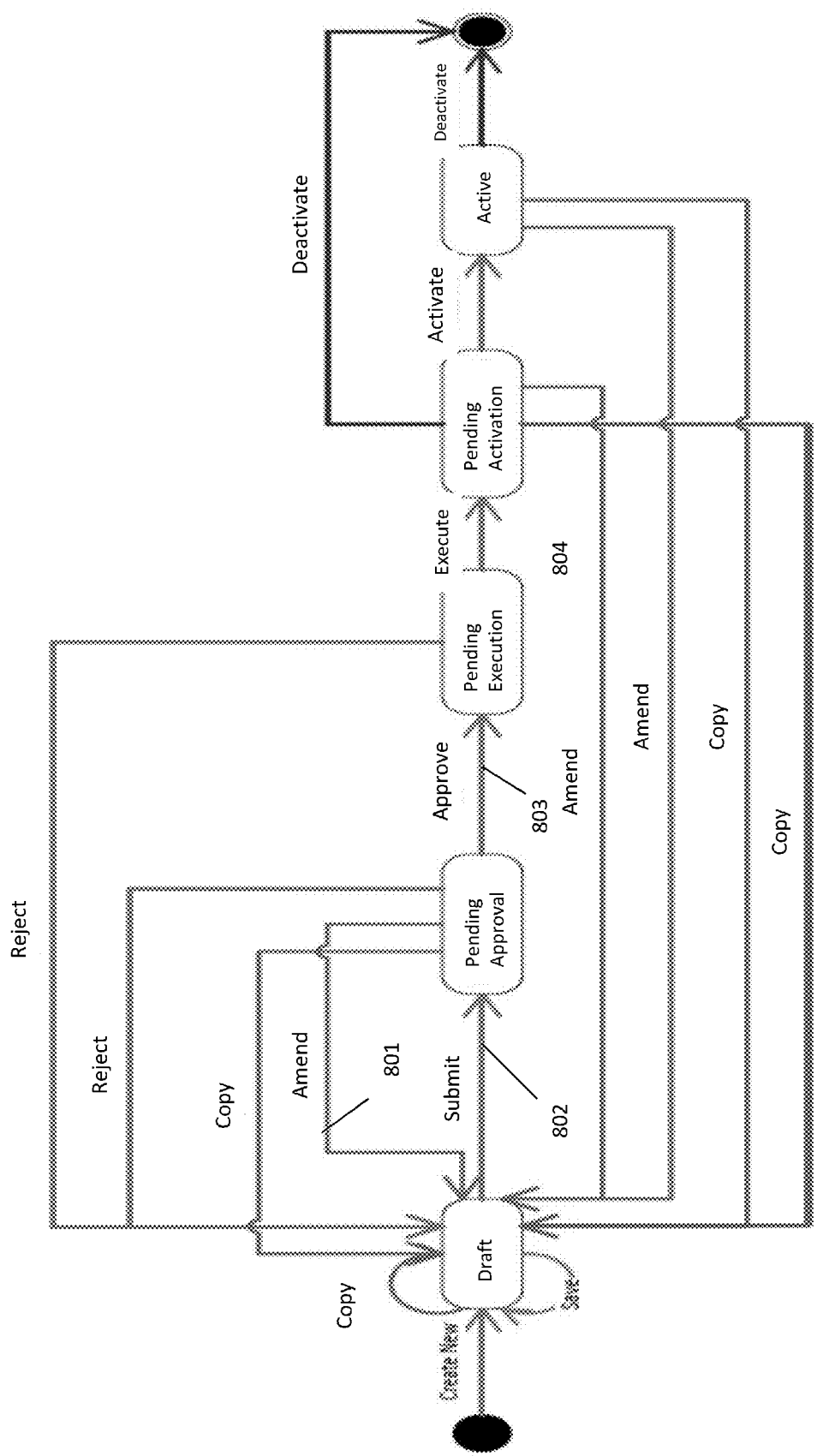
FIG. 8 illustrates a flow diagram of an exemplary embodiment depicting the parties' actions in creating and finalizing a collateral eligible schedule.

FIG. 8 shows a timing flow diagram of the method. The method begins with creating a draft of a new collateral eligibility schedule. The draft schedule can be saved and reviewed and revised. Once the draft schedule is complete, it may be submitted for review and approval at 802 by the approval sources. If the submitted schedule is rejected by one of the approval sources, the schedule may be sent back to the drafting party at 801 to edit the schedule and correct the errors in the schedule and then resubmitting the edited schedule for approval again at 802. Further, the submitted draft can be copied or rejected, and the rejected draft can be revised and corrected and resubmitted for approval at 802. When the draft is pending approval and all approvals from the approval sources are received at 803, the approved schedule awaits execution. At this point, the approved schedule can be rejected and return to the draft stage, or can be executed and await activation on a date set forth in the executed schedule. While awaiting activation, the executed schedule can be deactivated and terminated without activation. Otherwise, the executed schedule can be amended and return to the draft stage or be copied. When the activation date arrives, the executed schedule is activated. At this time, the activated schedule can be amended and return to the draft stage or be copied. The activated schedule will remain active according to the schedule, and after the active period expires, the schedule is deactivated.

Figure 9:
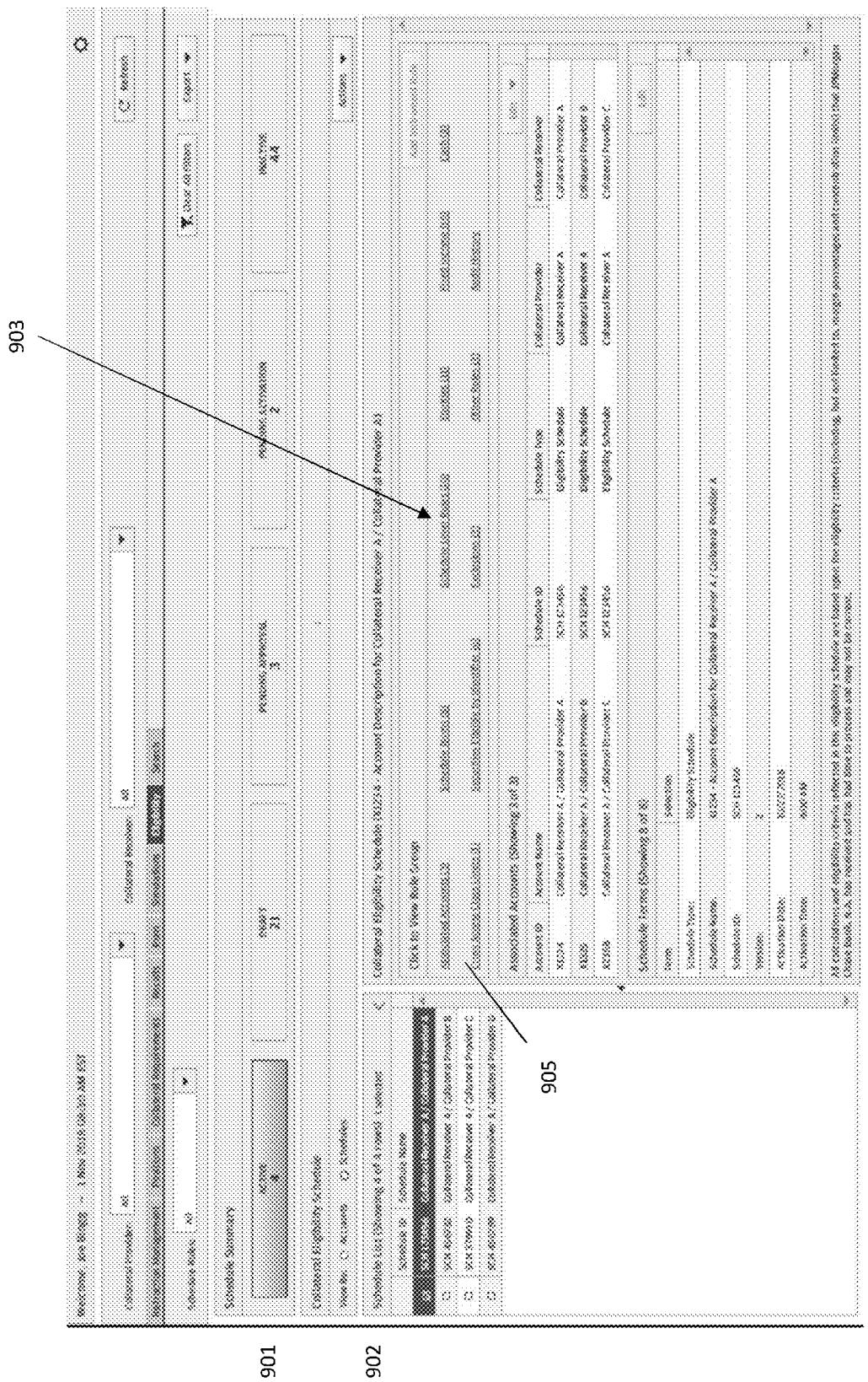
FIG. 9 illustrates an exemplary interface for reviewing schedules.

FIG. 9 shows an exemplary user interface for an embodiment of the CMS. From this interface, users/clients of the CMS are able to define the workflow required (i.e., maker/checker, just maker, authorized signer, etc.) at a Legal Entity level or schedule level. By way of example, the following roles can be utilized for both internal and external parties:

1. Maker, e.g., the person whose job it is to input the rules of the eligibility schedule into the Collateral Eligibility Service;
2. Checker, e.g., the person responsible for reviewing the rules that the maker submitted for accuracy. If the rules are incorrect, they reject the schedule, thereby reverting the schedule back to draft status; and
3. Authorized Signer, e.g., the people from the client who have been granted the ability to execute documents on behalf of their firm. Preferably, these are users who have been granted authorized signer entitlements. Further, the system can employ a platform that monitors authorized signers, e.g., AutoSig or other similar platform, for facilitating electronic execution.

The exemplary interface can include a Schedule Summary section 901 having a number of buttons indicating the status of schedules, e.g., active, draft, pending approval, pending activation and inactive. In this regard, the active status can represent schedules that are actively being used by the collateral engine to meet collateral requirements. A draft status can represent schedules in the process of being edited. Schedules in draft can be edited by multiple users, however, it may be preferable for editing to be performed by one user at a time. Pending approval status can identify schedules awaiting approvals from all approval sources, e.g., Collateral Provider, Collateral Receiver and agent. Pending activation status can identify approved schedules awaiting a defined "effective date" on which the schedule will be activated. Inactive status can represent schedules that have been unlinked from accounts and are no longer being used by the collateral engine to meet collateral requirements. If changes are desired in an active status schedule, such a schedule can be moved to draft. Once in draft, schedule and instrument level rules can be edited.

Moreover, accounts and legal entities can be added or deleted to schedules via the CMS interface, however, it is preferred that only one schedule is to be edited at a time (i.e., users cannot edit on an account level in order to restrict them from editing different types of schedules—Eligibility, Cross Account Limits, Receiver Exclusions—at the same time). In a schedule rules section of the CMS interface, users can define additional attributes of the schedule (i.e., type of underlying agreement, number of signatures required, etc.). Additionally in the draft section, the user may define an activation date on which the schedule should be activated/effective as a schedule level rule (i.e., immediately after execution or future-dated). Once clients have made all desired/requested changes, they may submit the schedule, which can initiate a workflow if changes require counterparty execution. Once the user submits the schedule, they have effectively executed the schedule. The counterparty will then receive a notification that the schedule is "pending approval" section if it requires their execution as defined by the product type/initial party. If the counterparty rejects the schedule, it will be kicked back to the draft section on the initial party. If the counterparty approves it, it will be sent to the agent for final execution.

When schedules are pending approval, if the draft or changes to the draft are approved, it will move to pending activation. If the draft or changes to the draft are rejected, it will move back to draft status at the initial party implementing the schedule changes. If a counterparty is rejecting a schedule change, a list of static reasons for rejection, e.g., via a drop-down menu, can be provided. The final step once the schedule has been approved by the required external parties is for the agent to approve or reject the changes. Once changes have been approved, the schedule will either be immediately effective or move into the "Pending Activation" status due to the future effective date.

A schedule can move to draft status from active by selecting the "Amend Schedule" button in the Active Status screen 902. In order to initiate the amendment of an existing schedule, the user will select the schedule on the active screen and click the "Amend Schedule" button. At that point, a copy will be made in draft. The existing schedule in active status will remain, however, an indicator may be displayed to show that the schedule is being edited in draft.

It is preferred that schedules are editable only on a single schedule level so that clients can only edit/amend one schedule at a time. All schedules in draft view for the selected Collateral Provider or Collateral Receiver can be displayed, e.g., on the left hand bar. Further, when the user/client selects on the draft schedules to edit, the corresponding rules (schedule-level and instrument level) can appear in on the right hand side of the screen, e.g., as a pop-up.

Accounts and legal entities can be added or deleted to schedules on this screen, and only one schedule can be edited at a time (i.e., users cannot edit on an account level as to restrict them from editing different types of schedules—Eligibility, Cross Account Limits, Receiver Exclusions—at the same time). It is preferred that schedules can only be editable on a single schedule level, not on the account view. In this way, users/clients can only edit one schedule at a time, which can avoid inadvertent changes made in other schedules without fully understanding the implications of such changes.

The CMS interface can include a tab or link 903 for editing schedule level rules. Schedule level rules can apply to the whole schedule. Preferably, the schedule-level rules would be a higher level over the instrument rules. These schedule-level rules can govern the whole schedule and can override any of the instrument level rules. The schedule-level rules can be editable via a listing rules in a drop-down menu on the interface. Moreover, additional rules can be included in this section that relate to other attributes of the schedule (e.g., the number of signatories required for execution of the schedule).

Accounts listed in the "Associated Accounts" section 905 may be subject to a new or amended schedule. When a user makes a change to its schedule, the accounts listed in the Associated Accounts grid can be subject to the rules listed in the schedule when the schedule is submitted and approved by all parties.

Associated accounts can preferably only be deleted or added from a schedule in draft status. Once users have selected a schedule from the Active status, they may select the "Amend Schedule" button in order to add or delete an account from a specific schedule. Preferably, the user is only able to add accounts that the user is entitled to, and accounts linked to the existing schedule can be removed from the selected schedule in draft status.

Advantageously, this technology provides users the ease of extending their offered services over cross-platform data integration without requiring any additional underlying technical code changes, and as a result enhancing the user experience. Further, this technology advantageously provides clients the ability to view eligibility schedules on a single screen and utilize exports and MIS to meet risk and optimization requirements. This technology also creates a simple, more efficient eligibility input process by providing a user interface that is intuitive and streamlined enough for clients to self-instruct their eligibility schedules using digital signature technology.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing automated collateral eligibility services implemented by one or more collateral management service (CMS) devices between a client and at least one other party, the method comprising:

accepting line of business profiles that include various types of attributes and rules from distinct individual businesses offering similar goods and/or services;

storing the business profiles, in a flexible storage model database so that businesses are provided ease of extending offered services over cross-platform data integration without requiring additional underlying technical code for conversion;

providing users access to the one or more CMS devices to search and answer their own queries of eligibility rules;

receiving a collateral eligibility schedule setup request from a client device, wherein the collateral eligibility schedule setup request comprises one or more attributes and one or more rules;

storing in a CMS database eligibility schedules sourced from other systems and formats in a third party application that are based on one or more rules as defined by the individual businesses the line of business profile;

initiating a current collateral eligibility schedule based on the received collateral eligibility schedule setup request;

transforming eligibility schedules in a third party application stored in the CMS database to a generic flexible canonical data model;

transmitting a notification of an action to be performed to the at least one other party to review the current collateral eligibility schedule, wherein a CMS user interface is configured to display the notification of the action and to display how long the action has been outstanding;

receiving approval of the current collateral eligibility schedule from the at least one other party; and activating the approved current collateral eligibility schedule.

2. The method according to claim 1, wherein the initiating the current collateral eligibility schedule comprises manually setting up the schedule through an interface with the one or more CMS devices.

3. The method according to claim 1, wherein the initiating the current collateral eligibility schedule comprises transforming a previously stored collateral eligibility schedule to populate an interface with the one or more CMS devices.

4. The method according to claim 1, wherein, before transmitting a notification to the at least one other party, the method further comprises storing the current collateral eligibility schedule.

5. The method according to claim 1, wherein the plurality of line of business profiles are accessible by the interface with the one or more CMS devices, and the method further comprises:
    associating one of the plurality of line of business profiles with the client,
    wherein the available criteria in the line of business profiles include workflow requirements and eligibility criteria.

6. The method according to claim 1, wherein, prior to receiving approval of the current collateral eligibility schedule, the method further comprises at least one of:
    the client modifying the current collateral eligibility schedule via an interface of one or more CMS devices; and
    the at least one other party modifying the current collateral eligibility schedule via an one or more CMS devices.

7. The method according to claim 1, wherein, prior to transmitting the notification, the method further comprises storing the current collateral eligibility schedule in at least one database accessible by the one or more CMS devices.

8. The method according to claim 7, further comprising receiving a request from an application to identify stored collateral eligibility schedules associated with at least one position and at least one agreement data.

9. The method according to claim 8, further comprising searching the at least one database accessible by the one or more CMS devices for stored collateral eligibility schedules associated with the at least one position and the at least one agreement data; and
    presenting search results listing the stored collateral eligibility schedules associated with the at least one position and the at least one agreement data.

10. The method according to claim 9, further comprising identifying eligibility and concentration limit constraints in the stored collateral eligibility schedules associated with the at least one position and the at least one agreement data listed in the search results.

11. The method according to claim 10, further comprising:
    selecting one of the stored collateral eligibility schedules associated with the at least one position and the at least one agreement data listed in the search results; and
    transmitting the selected one of the stored collateral eligibility schedules associated with the at least one position and the at least one agreement data to the requesting application.

12. The method according to claim 10, further comprising:
    selecting one of the stored collateral eligibility schedules associated with the at least one position and the at least one agreement data listed in the search results;
    modifying the selected one of the stored collateral eligibility schedules associated with the at least one position and the at least one agreement data; and
    transmitting the modified selected one of the stored collateral eligibility schedules associated with the at least one position and the at least one agreement data to the requesting application.

13. The method according to claim 7, wherein only one of the client or the at least one other party can access the stored current collateral eligibility schedule in at least one database accessible by the one or more CMS devices at a time.

14. A system for providing automated collateral eligibility services via one or more collateral management service (CMS) devices, the system comprising:
    a processor;
    a memory including instructions that, when executed by the processor, cause the processor to perform operations including:
        accepting line of business profiles that include various types of attributes and rules from distinct individual businesses offering similar goods and/or services;
        storing the business profiles, in a flexible storage model database so that businesses are provided ease of extending offered services over cross-platform data integration without requiring additional underlying technical code for conversion;
        providing users access to the one or more CMS devices to search and answer their own queries of eligibility rules;
        receiving a collateral eligibility schedule setup request from a client device, wherein the collateral eligibility schedule setup request comprises one or more attributes and one or more rules;
        storing in a CMS database eligibility schedules sourced from other systems and formats in a third party application that are based on one or more rules as defined by the individual businesses the line of business profile;
        initiating a current collateral eligibility schedule based on the received collateral eligibility schedule setup request;
        transforming eligibility schedules in a third party application stored in the CMS database to a generic flexible canonical data model;
        transmitting a notification of an action to be performed to the at least one other party to review the current collateral eligibility schedule;
        receiving approval of the current collateral eligibility schedule from the at least one other party; and
        activating the approved current collateral eligibility schedule; and
    a CMS user interface configured to display the notification for the action to be performed and to display how long the action has been outstanding.

15. A non-transitory computer-readable medium configured to store instructions for implementing a method for providing automated collateral eligibility services via one or more collateral management service (CMS) devices, wherein when executed, the instructions cause a computer to:
    accept line of business profiles that include various types of attributes and rules from distinct individual businesses offering similar goods and/or services;
    store the business profiles, in a flexible storage model database so that businesses are provided ease of extending offered services over cross-platform data integration without requiring additional underlying technical code for conversion;
provide users access to the one or more CMS devices to search and answer their own queries of eligibility rules;
receive a collateral eligibility schedule setup request from a client device, wherein the collateral eligibility schedule setup request comprises one or more attributes and one or more rules;
store in a CMS database eligibility schedules sourced from other systems and formats in a third party application that are based on one or more rules as defined by the individual businesses the line of business profile;
initiate a current collateral eligibility schedule based on the received collateral eligibility schedule setup request;
transform eligibility schedules in a third party application stored in the CMS database to a generic flexible canonical data model;
transmit a notification of an action to be performed to the at least one other party to review the current collateral eligibility schedule, wherein the notification of the action to be performed is also transmitted for display on a CMS user interface and to display how long the action has been outstanding;
receive approval of the current collateral eligibility schedule from the at least one other party; and
activate the approved current collateral eligibility schedule.

* * * * *